(12) United States Patent
Chandrasekaran

(10) Patent No.: US 12,302,120 B1
(45) Date of Patent: May 13, 2025

(54) GEOSPATIAL TELECOMMUNICATIONS NETWORK COVERAGE BALANCING USING NETWORK CELL BOUNDARIES

(71) Applicant: T-Mobile USA, Inc., Bellevue, WA (US)

(72) Inventor: Nirmal Chandrasekaran, Hillsborough, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/894,859

(22) Filed: Sep. 24, 2024

(51) Int. Cl.
*H04W 16/18* (2009.01)
*H04W 16/14* (2009.01)
*H04W 16/28* (2009.01)

(52) U.S. Cl.
CPC ........... *H04W 16/18* (2013.01); *H04W 16/14* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 7,725,108 B2 | 5/2010 | Vincent |
| 8,169,933 B2 | 5/2012 | Srinivasan et al. |
| 8,472,950 B2 | 6/2013 | Bao et al. |
| 8,983,470 B1 | 3/2015 | Ryan et al. |
| 9,538,401 B1 | 1/2017 | Ouyang et al. |
| 9,654,991 B2 | 5/2017 | Yang et al. |
| 9,706,411 B2 | 7/2017 | Goswami et al. |
| 9,848,337 B2 | 12/2017 | Puthenpura et al. |
| 9,978,284 B2 | 5/2018 | Riedelsheimer et al. |
| 10,039,013 B2 | 7/2018 | Periyasamy et al. |
| 10,098,007 B2 | 10/2018 | Chandrasekaran et al. |
| 10,334,488 B2 | 6/2019 | Periyasamy et al. |
| 10,542,442 B2 | 1/2020 | Johnson |
| 10,609,587 B2 | 3/2020 | Livschitz et al. |
| 10,728,773 B2 | 7/2020 | Ouyang et al. |
| 10,827,361 B2 | 11/2020 | Andersson et al. |
| 10,880,898 B2 | 12/2020 | Bellamkonda et al. |
| 10,893,424 B1 | 1/2021 | Malboubi et al. |
| 11,012,868 B1 | 5/2021 | Yang et al. |
| 11,109,283 B1 | 8/2021 | Kulkarni et al. |

(Continued)

FOREIGN PATENT DOCUMENTS

| | | |
|---|---|---|
| CN | 111988813 A | 11/2020 |
| CN | 112950243 A | 6/2021 |

(Continued)

*Primary Examiner* — Faruk Hamza
*Assistant Examiner* — Cassandra L Decker
(74) *Attorney, Agent, or Firm* — Perkins Coie LLP

(57) ABSTRACT

Data describing network coverage provided to multiple user equipments by a telecommunications network is obtained. The data is associated with geographical locations serviced by the telecommunications network. The data is grouped according to the geographical locations into multiple clusters. Using the multiple clusters, multiple geospatial polygons associated with cells of the telecommunications network are generated. Differences are determined in the network coverage between the cells using the geospatial polygons. Imbalances are determined in the telecommunications network based on the differences in the network coverage between the cells.

20 Claims, 6 Drawing Sheets

(56) References Cited

U.S. PATENT DOCUMENTS

| | | |
|---|---|---|
| 11,246,042 B2 | 2/2022 | Tsui et al. |
| 11,350,289 B2 | 5/2022 | Jat |
| 11,438,769 B2 | 9/2022 | Sevindik et al. |
| 11,470,490 B1 | 10/2022 | Tuli et al. |
| 11,483,715 B2 | 10/2022 | Sevindik et al. |
| 11,564,130 B2 | 1/2023 | Gomes et al. |
| 11,606,732 B1 | 3/2023 | Chandrasekaran |
| 11,647,442 B2 | 5/2023 | Herczku |
| 11,800,382 B1 | 10/2023 | Chandrasekaran |
| 11,838,826 B1 | 12/2023 | Chandrasekaran |
| 12,058,539 B2 | 8/2024 | Apatachioae |
| 12,089,069 B1 | 9/2024 | Chandrasekaran |
| 2005/0288017 A1 | 12/2005 | Doumenc et al. |
| 2011/0307428 A1* | 12/2011 | Wirola ............... H04W 4/029 |
| | | 706/12 |
| 2012/0178377 A1* | 7/2012 | Yamazaki ......... H04L 27/0006 |
| | | 455/67.11 |
| 2013/0040649 A1 | 2/2013 | Soto et al. |
| 2014/0073317 A1 | 3/2014 | Zhou et al. |
| 2021/0368320 A1 | 11/2021 | Mitchell |
| 2022/0124574 A1* | 4/2022 | Veggalam ............ H04W 24/02 |
| 2022/0141840 A1* | 5/2022 | Wu ................... H04W 72/1215 |
| | | 370/329 |
| 2023/0037893 A1 | 2/2023 | Vankayala et al. |
| 2023/0071942 A1 | 3/2023 | Gomes et al. |
| 2023/0110023 A1 | 4/2023 | Bellamkonda et al. |
| 2023/0199514 A1 | 6/2023 | Singh et al. |
| 2023/0247443 A1 | 8/2023 | Magzimof et al. |
| 2023/0269000 A1 | 8/2023 | Rahman |
| 2023/0354045 A1 | 11/2023 | Kumar et al. |
| 2023/0401792 A1* | 12/2023 | Hofmann ................ G06T 17/05 |
| 2024/0049128 A1 | 2/2024 | Ludwig et al. |
| 2024/0155362 A1 | 5/2024 | Indrieri et al. |

FOREIGN PATENT DOCUMENTS

| | | |
|---|---|---|
| CN | 114501596 B | 1/2024 |
| WO | 2015117375 A1 | 8/2015 |
| WO | 2018026262 A2 | 2/2018 |
| WO | WO-2024032872 A1 * | 2/2024 ............ H04W 16/28 |

* cited by examiner

GEOSPATIAL TELECOMMUNICATIONS NETWORK COVERAGE BALANCING USING NETWORK CELL BOUNDARIES

BACKGROUND

Next-generation telecommunications networks are predicted to be significantly faster than previous generation networks because of improvements in radio interface modulation and coding techniques and physical-layer technologies. However, defects in the antenna equipment and ground equipment, faulty transmitter/receivers, and malfunctioning power sources can cause network coverage of the telecommunications network to be inadequate. Moreover, conventional network testing methods (e.g., using drive testing) can be time- and resource-intensive. The time taken to perform drive testing can especially be prohibitive for large geographical areas or when the routes to be driven across a geographical area are complex.

BRIEF DESCRIPTION OF THE DRAWINGS

Detailed descriptions of implementations of the present technology will be described and explained through the use of the accompanying drawings.

Figure 1:
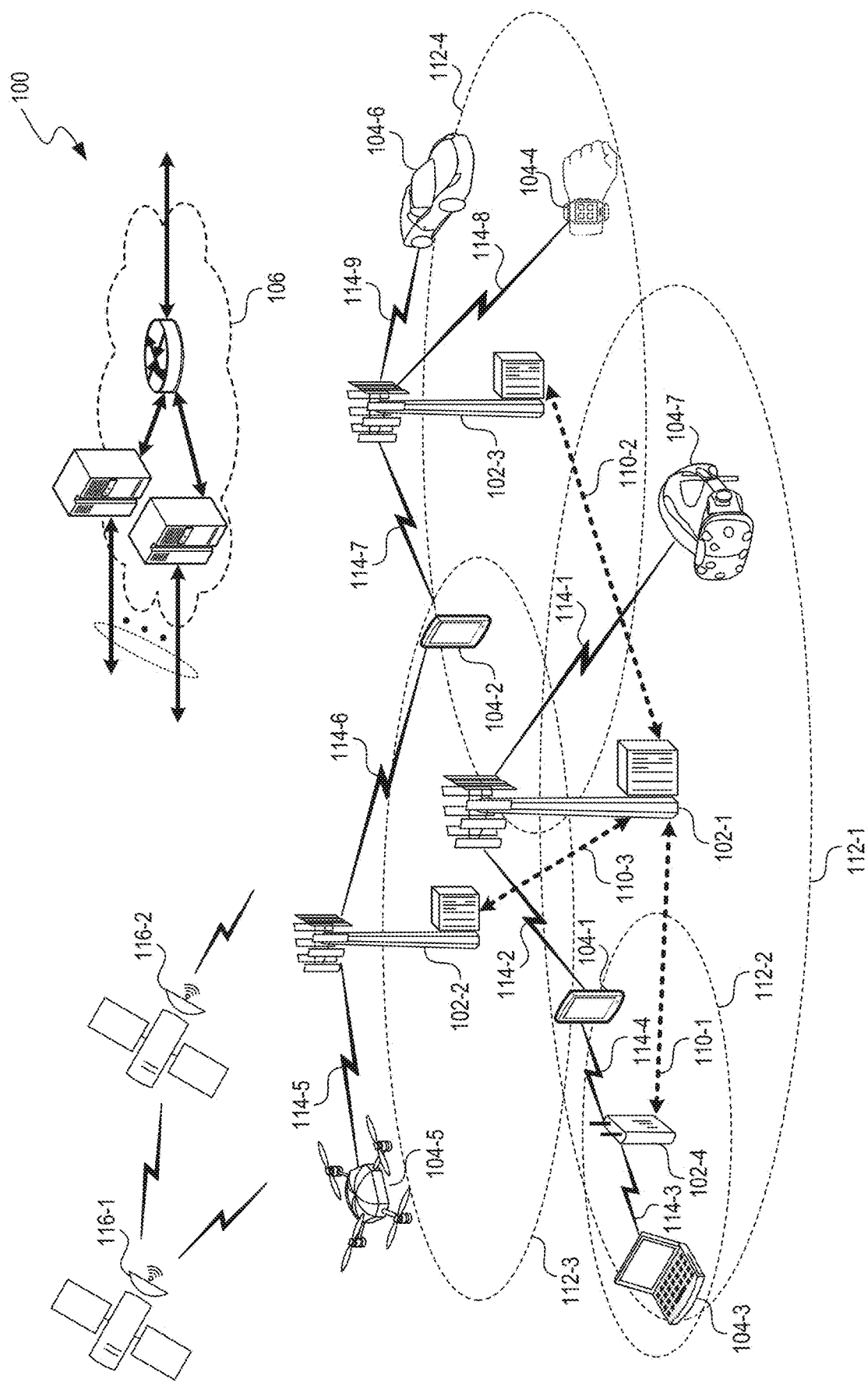
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications networks are being designed to support applications beyond current mobile use scenarios. Next-generation networks are expected to support demanding and diverse applications such as ubiquitous instant communications, pervasive intelligence, extended-reality applications, and the highly distributed Internet of things (HDIoT). A telecommunications network can have multiple network layers with different spectrum configurations and functions. Configuring and reconfiguring the network for high performance can include determining how the layers overlap with each other and how the layers cover the intended geographical area. With network complexity increasing every quarter due to new cell sites, and changes to the bandwidth/spectrum and additional deployments, the time taken to improve the network coverage can be prohibitive. Moreover, conventional network testing methods (e.g., using drive testing) can be time- and resource-intensive. The time taken to perform drive testing can especially be prohibitive for large geographical areas or when the routes to be driven across a geographical area are complex. There is thus a need for new technologies that can balance the network coverage provided by telecommunications networks.

This document discloses methods, systems, and apparatuses for geospatial telecommunications network coverage balancing using network cell boundaries. In some implementations, network data describing network coverage is obtained from user devices. The user devices are serviced by a sector of a cell site of a telecommunications network. The cell site includes a first cell and a second cell, and the network data is associated with multiple geographical locations. The first cell and the second cell are associated with a particular spectrum frequency of the sector. An unsupervised artificial intelligence (AI) method is used to group the network data according to the geographical locations into a first cluster and a second cluster. The first cluster is associated with the first cell and the second cluster is associated with the second cell. A first geospatial polygon associated with the first cluster and a second geospatial polygon associated with the second cluster are generated. An imbalance in the network coverage is determined by comparing the first geospatial polygon with the second geospatial polygon. An action is performed on the cell site to adjust the imbalance in the network coverage.

In some instances, the network data is grouped into a first cluster associated with a first layer of the sector and a second cluster associated with a second layer of the sector. The first layer is associated with a first spectrum frequency and the second layer is associated with a second spectrum frequency greater than the first spectrum frequency. From the network data, a first amount of traffic associated with the first cluster and a second amount of traffic associated with the second cluster are determined. An AI model is used to determine an imbalance in the traffic based on the first amount of traffic and the second amount of traffic. An action is determined to adjust the imbalance in the traffic.

In some implementations, the network data is grouped into multiple clusters associated with multiple layers of the sector. The layers can have multiple frequency carriers. Multiple convex hulls based on the clusters are generated. Differences in the network coverage are determined across the frequency carriers using the convex hulls. An imbalance in the sector is determined based on the differences in the network coverage. An action to adjust the imbalance in the sector is determined based on the differences in the network coverage.

The benefits and advantages of the implementations described herein include a significant reduction in computation time compared to conventional methods for comparing network layer performance. The disclosed methods for geospatial telecommunications network coverage balancing using network cell boundaries provide more efficient initial network deployment and network imbalance identification in newly launched network cell sites. The apparatuses for coverage boundary comparison disclosed herein can be extended to perform capacity comparisons between layers for traffic balancing. The disclosed systems enable rapid fixes to cell sites thus improving network coverage and performance.

Further, the methods disclosed herein can cause a reduction in greenhouse gas emissions compared to traditional methods for testing telecommunication networks. Every year, approximately 40 billion tons of $CO^2$ are emitted around the world. Power consumption by digital technologies including telecommunications networks account for approximately 4% of this figure. Further, conventional methods for network performance evaluation that rely on the use of gas-powered vehicles can exacerbate the causes of climate change. The implementations for network coverage balancing disclosed herein can mitigate climate change by reducing and/or preventing additional greenhouse gas emissions into the atmosphere. For example, by reducing the need for drive testing, the disclosed systems reduce fuel consumption and the associated emissions from vehicles used in drive testing. Additionally, the adjustments to the network reduce the overall energy consumption of the network by lowering unnecessary power usage by faulty antenna positioning, further contributing to lower carbon emissions. Therefore, the disclosed implementations for network coverage balancing mitigate climate change and the effects of climate change by preventing additional greenhouse gas emissions and reducing unnecessary electrical power usage in comparison to conventional network technologies.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
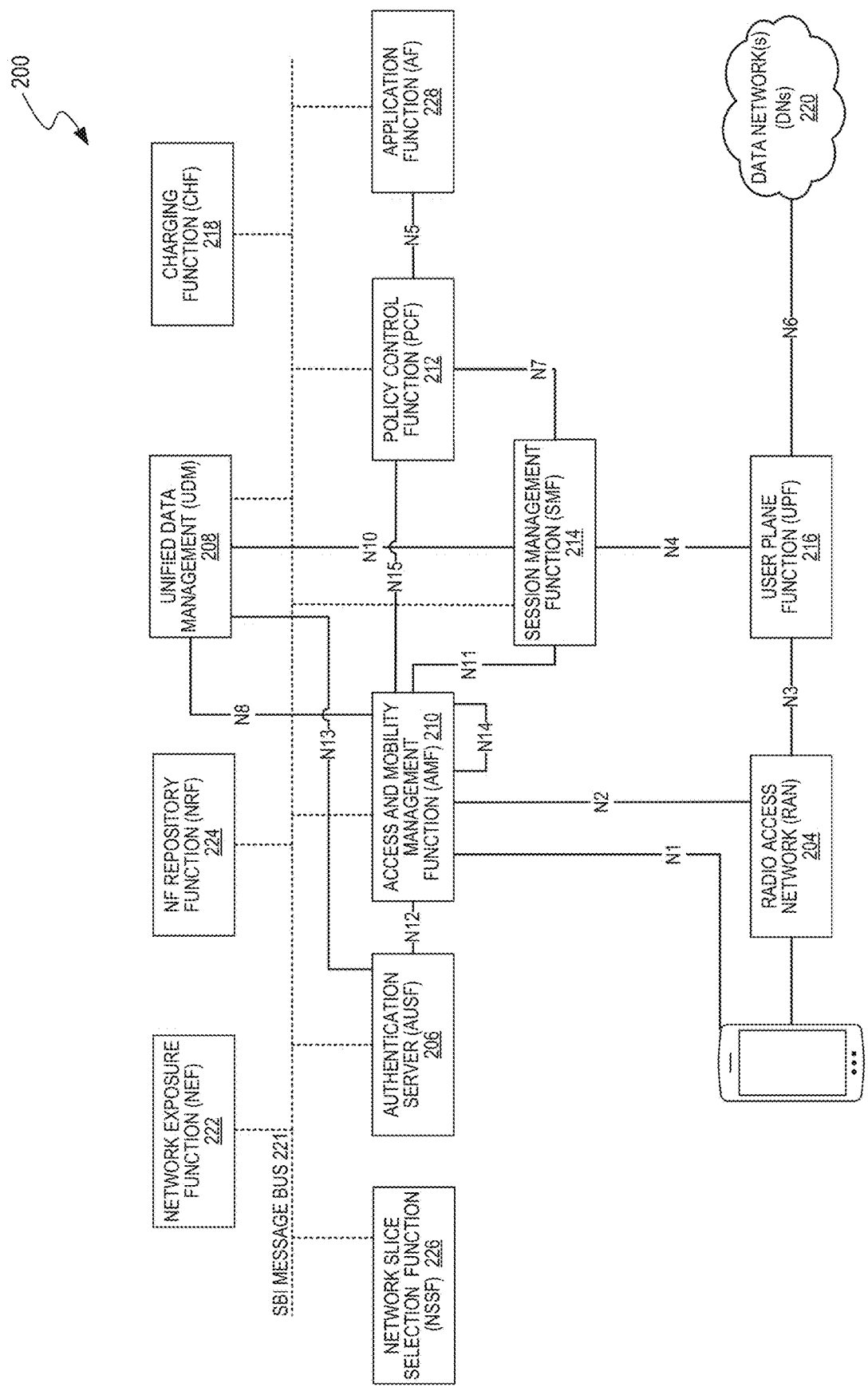
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Telecommunications Network Coverage Balancing

Figure 3:
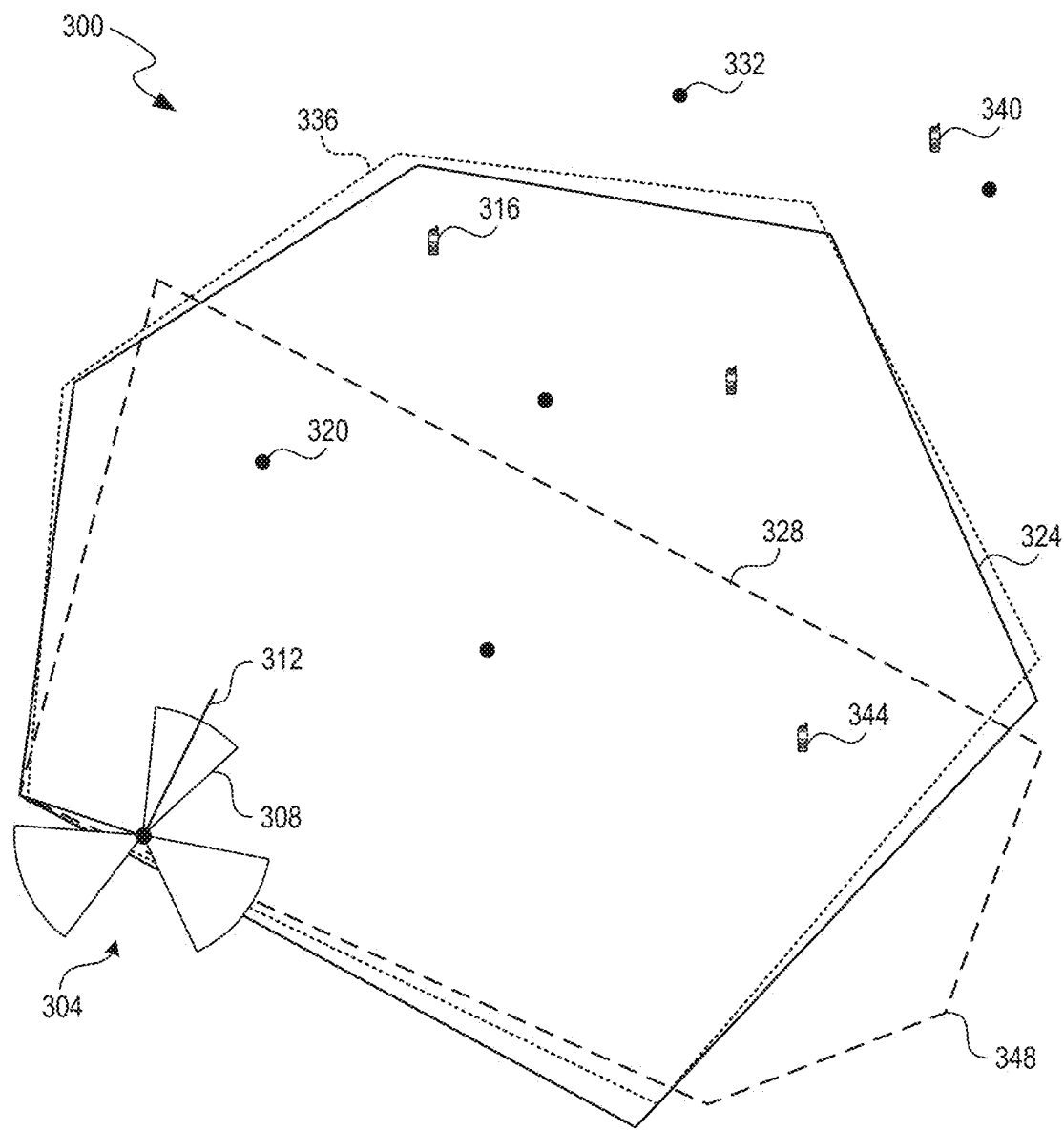
FIG. 3 is a drawing that illustrates an example system for geospatial telecommunications network coverage balancing using network cell boundaries.

FIG. 3 is a drawing that illustrates an example system 300 for geospatial telecommunications network coverage balancing using network cell boundaries. System 300 includes a cell site 304 of a telecommunications network and wireless devices 316, 340, 344. The cell site 304, also known as a cell tower or base transceiver station, includes equipment that transmits and receives radio signals for cellular data and voice. The cell site 304 can be a tower or rooftop where antenna and cellular equipment is located (generally with an identifying latitude and longitude of the tower's geographical position). The wireless devices 316, 340, 344 are laptops, desktops, or mobile devices similar to wireless devices 104-1 through 104-7, illustrated and described in more detail with reference to FIG. 1. The system 300 is implemented using components of example computer system 600 illustrated and described in more detail with reference to FIG. 6. Likewise, embodiments of example system 300 can include different and/or additional components or can be connected in different ways.

Network data is obtained using the wireless devices 316, 340, 344, which are located at different geographical locations serviced by the cell site 304 as shown by FIG. 3. In some implementations, the network data is reported by the wireless devices 316, 340, 344 to the telecommunications network or collected from the wireless devices 316, 340, 344 by the telecommunications network. For example, multiple signaling messages are passed back and forth between the wireless devices 316, 340, 344 and the telecommunications network. A slice of the signaling messages can be captured in which network coverage information is recorded as observed by the wireless devices 316, 340, 344 and reported back to the telecommunications network. The network data is collected from multiple wireless devices and can be stored in databases on the network side. This network data is used for tuning the network coverage and network performance.

The network data can include geolocated, user reported coverage datasets. A user of a wireless device 316 can perceive the network coverage in terms of "bars" on the wireless device 316. The lower the frequency band used, the better the coverage. An example network data point 320 is shown by FIG. 3. The network data point 320 can include information describing signal strength, call quality, or capacity reported by one or more wireless devices. The cell site 304 belongs to a telecommunications network, which is the same as or similar to the network 100 illustrated and described in more detail with reference to FIG. 1. The cell site 304 includes one or more antennas positioned on a raised structure, such as a tower or radio mast, that supports the antennas. The cell site 304 also includes transmitters/receivers, a Global Positioning System (GPS) receiver, primary and backup power sources, a computer system including digital signal processors, and control electronics. The cell site 304 can have a usable range of up to 25 miles and a radio signal range of up to 45 miles.

The network data collected from a wireless device can include information about the signal strength for calls, the wireless device's location, data usage, call quality, bandwidth observed, latency observed, etc. The network data can be geolocated, user reported coverage data, crowdsourced network data, or network data stored in internal datasets of the telecommunications network. The network data obtained is associated with a sector 308 of the cell site 304. The cell site 304 has multiple sectors, which are usually arranged in a circle around the cell site 304. The sector 308 is a specific area of coverage that radiates from the cell site's directional antenna. The number of sectors and their configuration can vary. For example, the cell site 304 has multiple sectors in each of which one or more antennae transmit most of their energy in a portion of the 360 degree area around the cell site 304. There can be 1-6 sectors typically in a cell site. Each sector is individually designed and the network coverage is tunable in each sector.

The network data can include information describing network coverage provided by the sector 308 of the cell site 304. The information describing network coverage indicates the geographical extent of the usable signal strength that is strong enough for a wireless device (such as a smartphone or router) to connect to the cell site 304 and to send/receive cellular data to/from the cell site 304. When the signal strength is less than a threshold value (e.g., −124 decibel-milliwatt (dBm)), the quality of the cellular signal is inadequate, and performance suffers. Therefore, the information describing network coverage indicates the area where the signal strength is greater than a threshold value. The threshold value can differ between cells and layers and depends on whether the geographical area serviced by the cell site 304 is urban, suburban, or rural.

The telecommunications network and cellular technology (e.g., LTE or 5G) can be deployed in different spectrum bands. A spectrum band indicates a frequency for the air wave, e.g., 2500 MHz or 1900 MHZ. the bandwidth is a portion around the spectrum frequency that is licensed or owned by the telecommunications network. For example, a 100 MHz bandwidth in the 2500 MHz band can be 2450-2550 MHz. A spectrum frequency represents a generic number indicating a "band" of frequencies that are divided into smaller blocks of frequencies and auctioned to networks.

The deployment of a particular cellular technology in a particular spectrum band is called a layer (e.g., 4G in 2500 MHZ, 5G in 2500 MHZ, or 600 MHZ). A cell refers to a portion of a layer that has a particular frequency carrier. One or more threshold values are determined and designed based on extensive testing when a new cellular technology is launched. Within each layer, there can be different portions of the same spectrum used for the same technology. For example, LTE has a maximum 20 MHz per deployment and 5G has maximum of 100 MHz. If the available spectrum is greater than the above limits, multiple frequency carriers of the layer can be deployed. For example, with 120 MHz of 2500 MHZ spectrum, two frequency carriers of 5G can be deployed, e.g., 100 MHz and 20 MHz. Each frequency carrier of each layer of each sector is identified as a cell. Each cell has various attributes that can be tuned to control coverage and capacity of the cell. User of the wireless device 316 perceives the capacity as Customer perceives as the speed on the wireless device 316. The greater the frequency spectrum, the greater the capacity.

Most rooftop cell sites have three sets of antennas, or sectors, that are pointed at 120-degree intervals. Each sector typically has 2-4 antennas. Sector antennas are directional microwave antennas that focus radio waves in a specific direction. They are often used in cell phone base stations, but can also be used in other mobile communication systems, such as Wi-Fi. The strength and angle of each sector can be adjusted based on coverage from other towers in the area and based on the disclosed methods for improving coverage and performance. Sector antennas are typically used for limited-range distances of around 4-5 kilometers.

Network data samples can be obtained for each layer of each sector. Geospatial AI clustering methods are used to identify "dense" areas of the samples and cluster them (to determine a prominent coverage area of each layer). For example, the network data obtained is grouped into a first cluster associated with a first layer of the sector 308 and a second cluster associated with a second layer of the sector 308. The network data point 320 lies within the first cluster and the second cluster. Network data reported by wireless device 316 lies within the first cluster but not within the second cluster. Network data reported by wireless device 344 lies within the first cluster and within the second cluster. Grouping (or clustering) the network data reported by the wireless devices 316, 340, 344 is used to remove outliers (e.g., outlier 332) from the network data. The outliers represent data points (e.g., reported by wireless device 340) that differ significantly from other observations. An outlier may be due to a variability in the measurement, an indication of novel data, or it may be the result of experimental error.

The telecommunications network as well as the cellular technology (e.g., LTE or 5G) for the telecommunications network can be deployed in different spectrum bands. The deployment of a particular cellular technology in a specific spectrum band is referred to as a layer. For example, 4G deployed at the 2500 MHz spectrum frequency can be a layer. 5G deployed at the 2500 MHz spectrum frequency can be another layer. 5G deployed at the 600 MHz spectrum frequency can be another layer.

In some examples, the first layer is associated with a first spectrum frequency (e.g., 600 MHZ) and the second layer is associated with a second spectrum frequency (e.g., 2500 MHZ), which is greater than the first spectrum frequency. The first layer can be associated with a first bandwidth (e.g., 20 MHZ) and the second layer is associated with a second bandwidth (e.g., 190 MHZ), which is greater than the first bandwidth. Hence, the second layer can carry more traffic than the first layer. For example, the network can be designed and configured for the second layer to carry four, six, or eight times the traffic that the first layer carries. The network data is used to determine a first amount of traffic observed to be associated with (actually carried by) the first cluster or layer at 600 MHz and a second amount of traffic associated with the second cluster or layer at 2500 MHZ. For example, the network is designed and configured for the second layer to carry eight times the traffic that the first layer carries. However, based on the network data, it is determined that the second layer is actually carrying only five times the traffic that the first layer is carrying, which means the traffic is imbalanced compared to the network design strategy. Therefore, "imbalance" between layers of a sector can be determined based on the "network design strategy."

The traffic is proportional to the number of wireless devices receiving signals from a certain frequency carrier and the amount of data can they send and receive on that frequency carrier. Lower frequencies can travel farther than higher frequencies. However, higher frequency spectrum bands have a larger bandwidth available. For example in the 600 MHz spectrum, there is only 20 MHz of bandwidth available. But these signals travel further so they provide more reliable network coverage for longer distances. In the 2500 MHz spectrum, there is 190 MHz of total bandwidth available to deploy (in many areas). These signals travel shorter distances compared to the 600 MHz signals, so the 2500 MHz signals are used for higher capacity cells. The network can be configured such that wireless devices can connect to the 600 MHz band only if they are beyond the coverage of the 2500 MHz. Hence, most of the traffic can be sent via the 2500 MHz layer. In implementations, if only 20 MHz of bandwidth is available in the 2500 MHz layer, the traffic will be balanced such that the 2500 MHz band and the 600 MHz band carry an equal amount of traffic. The telecommunications network can manipulate the network configuration such that wireless devices get the most out of the spectrum as well as find a balance between network coverage, and voice and data performance and capacity.

An artificial intelligence (AI) model can be used to determine an imbalance in the traffic based on the first amount of traffic and the second amount of traffic. An example AI model 530 that can be used in the implementations disclosed herein is illustrated and described in more detail with reference to FIG. 5. For example, the AI model is trained using a predetermined proportion of traffic between the first layer and the second layer (based on the network design strategy). The predetermined proportion in the example described above is 1:8, while the actual proportion determined from the network data is 1:5. Example methods for training as well as executing an AI model are described in more detail with reference to FIG. 5.

An action to be performed on the cell site 304 to adjust the imbalance in the traffic to improve the network performance is determined. For example, the action to adjust the imbalance in the traffic is determined based on the predetermined proportion of traffic between the first layer and the second layer. To perform an action, the network coverage can be rendered on a map to understand the extent of the network coverage of a cell using network data available from wireless devices. Cells of the same layer need to have enough "overlap" between them to avoid coverage holes (e.g., geospatial polygons 324, 336). Cells of different layers (e.g., geospatial polygons 324, 328) need to have an acceptable overlap to make sure that the high spectrum layer utilization (e.g., 2500 MHZ) is increased and the low band layers (e.g., 600 MHZ) are preserved for network coverage expansion.

The action performed to adjust an imbalance in the network coverage or traffic can include adjusting an azimuth 312 of an antenna of the cell site 304. The azimuth 312 is a horizontal direction that the antenna is pointing in, measured as an angle clockwise from true north, essentially indicating which compass direction the antenna is aimed towards. The azimuth 312 is a key parameter in determining the coverage area of the cell site 304. The azimuth 312 is typically measured in degrees, with 0 degrees representing north, 90 degrees east, 180 degrees south, and 270 degrees west. For example, if the cell site 304 has three identical 120° sectors, the antennas can point at 0°, 120° and 240° to improve network coverage. By adjusting the azimuth 312 of the cell site antenna, the network coverage can be improved in specific directions, ensuring greater signal strength for users in targeted areas. Directional antennas have a focused radiation pattern, meaning their azimuth is particularly important for directing the signal towards desired locations.

In some implementations, the first layer (e.g., at 600 MHZ) is associated with a first network coverage and the second layer (e.g., at 2500 MHZ) is associated with a second network coverage less than the first network coverage. Because of the longer wavelength and lower frequency of the first layer, the first layer provides greater coverage, particularly in rural areas and deep inside buildings. Because of the shorter wavelength and higher frequency of the second layer, the second layer provides significantly faster speeds than the first layer and can be deployed in urban centers and key transportation corridors.

To analyze the coverage balance provided by the first layer and the second layer based on the network data, boundary calculations are applied on the clusters associated with the layer coverage. The boundary calculations yield a geospatial polygon for each layer of each sector. For example, a geospatial polygon 324 associated with the first cluster is generated. Similarly, a geospatial polygon 328 associated with the second cluster is generated. The geospatial polygons indicate coverage boundaries for each layer in each sector. The geospatial polygon 324 circumscribes a boundary of the first cluster and the geospatial polygon 328 circumscribes a boundary of the second cluster. The geospatial polygons 324, 328 can each be convex hulls. A convex hull is a smallest convex set that contains a given set of points (e.g., network data point 320) or shapes. A convex hull can be defined as the intersection of all convex sets that contain the set of points, or as the set of all convex combinations of points in the set. A convex hull of a set of points is a polygon (e.g., geospatial polygon 324) that connects the outermost points (e.g., endpoint 348) in the set, and all of its inner angles are less than 180 degrees.

Geospatial methods are used to compare the coverage polygons associated with the layers of each sector. For example, FIG. 3 shows that the geospatial polygon 324 is larger than the geospatial polygon 328 with a good amount of overlap. To determine holes in the coverage, it is determined whether the geospatial polygon 328 lies entirely within the geospatial polygon 324. FIG. 3 shows that several small portions of the geospatial polygon 328 lie outside the geospatial polygon 324. This means that the corresponding geographical areas have coverage at 2500 MHz but lack coverage at 600 MHZ, leading to an imbalance in the network coverage. Therefore, an action can be performed on the cell site 304 to adjust the imbalance in the network coverage to improve the network performance.

Determining the differences in the network coverage between layers or cells prevents greenhouse gas emissions that would be caused by multiple vehicles used to determine imbalances in the telecommunications network by drive testing. Because the network data is obtained from multiple wireless devices in existing use, drive testing is obviated.

In some implementations, the network data for sector 308 is grouped into multiple clusters associated with multiple layers of the sector as shown by FIG. 3. As discussed above, each cluster can be associated with a layer. The layers can have multiple frequency carriers, i.e., each layer can have one or more frequency carriers. When a layer has more than one frequency carrier, each portion of the layer associated with a different frequency carrier is referred to as a cell. Hence, a first cell can be associated with a first geospatial polygon (e.g., geospatial polygon 324) and a second cell can be associated with a second geospatial polygon (e.g., geospatial polygon 336).

A frequency carrier is a specific radio frequency within a layer that is used to transmit information by modulating its properties (e.g., amplitude or frequency) with the desired signal. The frequency carrier acts as a "transport vehicle" for cellular data or voice calls, enabling data to be carried over a communication channel. The frequency carrier is a stable, constant frequency that is modified to carry the actual voice or data signal, which is typically much lower in frequency. For example, the telecommunications network has 120 MHz of available bandwidth at a 5G 2500 MHz spectrum frequency. Hence, 80 MHz of bandwidth could be deployed using a first frequency carrier and 40 MHz of bandwidth could be deployed using a second frequency carrier. For example, the first frequency carrier is 2545 MHz and the second frequency carrier is 2640 MHz. The two frequency carriers need not have the same bandwidth. In this example, the expected traffic carried has a predetermined proportion by design of 2:1 between the first frequency carrier and the second frequency carrier. The spectrum frequency of 2500 MHz is the same between the two frequency carriers. Hence, the network coverage is expected to be the same if each of the two frequency carriers is provided the same output power.

A geospatial polygon (e.g., geospatial polygon 324) can be generated for a cluster of the network data that is associated with the first frequency carrier. Another geospatial polygon (e.g., geospatial polygon 336) can be generated for another cluster of the network data that is associated with the second frequency carrier. The two geospatial polygons 324, 336 are compared to determine whether the network coverage provided by the two frequency carriers is the same (or close to the same) and that there is no network imbalance. The implementations disclosed herein provide layer-to-layer comparison across the telecommunications network as well as frequency carrier-to-frequency carrier comparison within each layer to determine traffic imbalances, network coverage imbalances, and/or power supply imbalances. For example, if the antenna tilt is the same and the operating frequency is the same or close for two cells, the transmit power would be the differentiator in network coverage. The larger the transmit power, the larger the coverage area.

In some implementations, multiple convex hulls (e.g., e.g., geospatial polygons 324, 336) based on the clusters. For example, a different convex hull is generated for each cluster. Differences in the network coverage across the frequency carriers are determined using the convex hulls. In some examples, the geographical areas covered by the convex hulls, and the shapes of the convex hulls is determined and compared. Determining the differences in the network coverage can be performed by comparing boundaries of the convex hulls. For example, the corresponding angles (e.g., at endpoints) of the convex hulls are compared to determine whether the angles are congruent. The endpoints of the convex hulls are network data points that can include information describing signal strength, call quality, or capacity reported by one or more wireless devices. The corresponding sides of the convex hulls are compared to determine whether they are in proportion. The signal strength and traffic associated with each convex hull can also be compared. An imbalance in the sector 308 is determined based on the differences in the network coverage. An action to adjust the imbalance in the sector is determined based on the differences in the network coverage.

The determined action can be performed on the cell site 304. It can be determined whether performing the action increased a key performance indicator associated with the cell site 304. The key performance indicators can include availability (which measures how ready the network is for users to use services), customer satisfaction (which measures how satisfied customers are with services like network experience), network jitter (which indicates how well the network is operating, especially for applications that require real-time packet delivery), utilization, and/or service outages (which measures how often services go down).

An AI model can be trained using the network data and information describing the clusters and geospatial polygons to determine the imbalance in the sector. Methods to train AI models are described in more detail with reference to FIG. 5. The training data can include information describing the layers or cells evaluated for network coverage, traffic carried, and/or signal strength. For example, once a portion of a telecommunications network is classified as "Balanced" or "Imbalanced," the associated information can feed into a supervised AI classification algorithm to automatically identify issues in future cell sites.

The layers can include at least two of a low-band 5G layer, a mid-band 5G layer, and a high-band-5G layer. The telecommunications network can use a range of frequency bands to provide network coverage. For example, a low-frequency band can be 600 MHZ, which offers broad coverage and better signal penetration, especially in rural areas. In addition to the low-frequency band, mid-frequency bands such as 1900 MHz and 1700/2100 MHz can be used to provide a balance between coverage and capacity. High-frequency bands (e.g., 2500 MHZ) can be used to enhance network capacity and support the deployment of 5G technology. The high-frequency bands offer faster data speeds and low latency, enabling a seamless mobile experience. Using the implementations to evaluate network coverage disclosed herein, the telecommunications network delivers reliable coverage and high-speed connectivity to customers to enable them to stay connected wherever they go.

Figure 4:
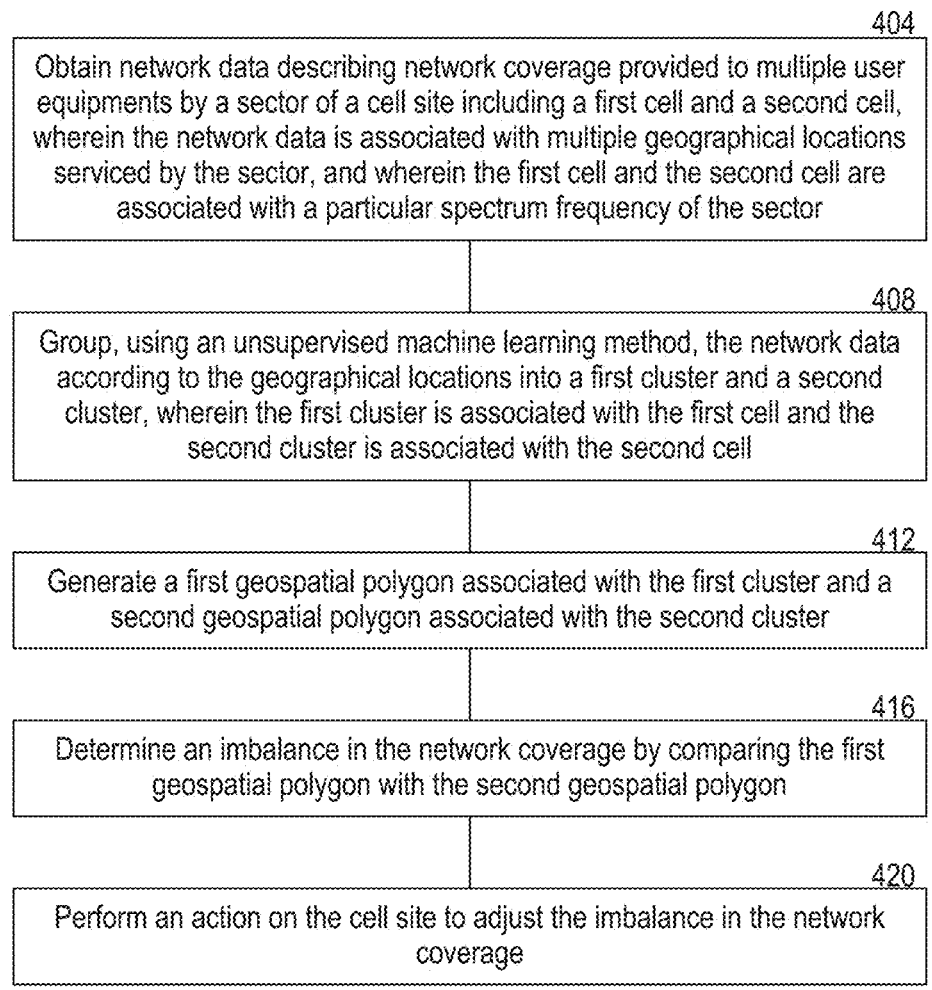
FIG. 4 is a flowchart that illustrates an example process for geospatial telecommunications network coverage balancing using network cell boundaries.

FIG. 4 is a flowchart that illustrates an example process for geospatial telecommunications network coverage balancing using network cell boundaries. In some implementations, the process is performed by a computer system communicably coupled to the cell site 304, which is illustrated and described in more detail with reference to FIG. 3. For example, the process can be performed by the computer system 600 illustrated and described in more detail with reference to FIG. 6. Particular entities, for example, the wireless devices 316, 340, 344 perform some or all of the steps of the process in other implementations. The wireless devices 316, 340, 344 are illustrated and described in more detail with reference to FIG. 3. Likewise, implementations can include different and/or additional steps or can perform the steps in different orders.

At 404, a computer system obtains network data describing network coverage provided to multiple user equipments (e.g., wireless devices 316, 340, 344) by a sector (e.g., sector 308 shown by FIG. 3) of a cell site (e.g., cell site 304). In some implementations, the network data is obtained by crowdsourcing. The cell site includes a first cell and a second cell. The network data is associated with multiple geographical locations serviced by the sector, as illustrated and described in more detail with reference to FIG. 3. The first cell and the second cell are associated with a particular spectrum frequency (e.g., 2500 MHz) of the sector. The implementations disclosed herein can be used for macro sites as well as smaller cells. For example, the cell site can be divided into one or more sectors, and each sector can have any number of layers deployed (e.g., 5G 2500 MHZ, PCS, 600 MHZ bands, LTE 2100 MHz, and/or 600/700 MHZ)

At 408, the computer system uses an unsupervised artificial intelligence method to group the network data according to the geographical locations into a first cluster and a second cluster. For example, the first cluster is associated with the first cell and the second cluster is associated with the second cell. Unsupervised learning in artificial intelligence is a type of machine learning that learns from data without human supervision. Unlike supervised learning, unsupervised machine learning models are given unlabeled data (e.g., network data) and allowed to discover patterns and insights without any explicit guidance or instruction. For example, the computer system groups similar network data points (e.g., network data point 320 shown by FIG. 3) into clusters. The network data points can include information describing signal strength, call quality, or capacity reported by one or more wireless devices.

In some implementations, the unsupervised artificial intelligence method used scans the unlabeled network data and sets measurements for specific data point features. The data points are then classified and grouped based on matching features. For example, the computer system can use K-means clustering, hierarchical clustering, Density-Based Spatial Clustering of Applications with Noise (DBSCAN), Mean Shift, Spectral Clustering, Affinity Propagation, and/or Distribution-based clustering. Clustering methods are described additionally with reference to FIG. 5.

The computer system can also collect network data reported by multiple wireless devices across the telecommunications network. The network data can be filtered to obtain information associated with one or more cell sites, one or more sectors, one or more layers, and/or one or more cells. In some implementations, the network data reported by the multiple wireless devices across the telecommunications network is segmented into clusters representing information associated with one or more cell sites, one or more sectors, one or more layers, and/or one or more cells. For example, each cluster can contain information associated with a cell or a layer. The clusters can be used to generate geospatial polygons to determine network imbalances using the embodiments disclosed herein.

At 412, the computer system generates a first geospatial polygon (e.g., geospatial polygon 324) associated with the first cluster and a second geospatial polygon (e.g., geospatial polygon 336) associated with the second cluster. A geospatial polygon is a closed shape that represents a geographic area on Earth, defined by a set of x and y coordinates. The geospatial polygons generated for the clusters by the computer system can be used in geovisualization functions and for geocomputations to determine imbalances in a telecommunications network. For example, the generated geospatial polygons can be used to measure the area and perimeter of locations having poor coverage.

At 416, the computer system determines an imbalance in the network coverage by comparing the first geospatial polygon with the second geospatial polygon. Example methods to compare polygons are described in more detail with reference to FIG. 3. The geospatial polygon generated can be a convex hull. To generate the convex hull, the computer system connects endpoints (e.g., endpoint 348) of the associated cluster as shown by FIG. 3. In some implementations, the first cell has a first bandwidth (e.g., 40 MHZ) at a particular spectrum frequency (e.g., 2500 MHZ) and the second cell has a second bandwidth (e.g., 80 MHZ) at the particular spectrum frequency (e.g., 2500 MHZ). The computer system can use the network data segmented into the clusters to compare traffic carried by the first cell and the second cell based on the first bandwidth and the second bandwidth. For example, because the second bandwidth is twice the first bandwidth, the traffic carried by the second cell is expected to be (or can be designed to be) twice the traffic carried by the first cell.

At 420, the computer system performs an action on the cell site to adjust the imbalance in the network coverage. The action can be performed on "imbalanced" cells or sectors by changing relevant antenna tilt or azimuth, or addressing construction issues (e.g., a wall may be blocking an antenna). For example, the action can include adjusting a tilt of an antenna of the cell site. The computer system can cause actuators to physically or electronically change the angle at which the antenna points to direct the cellular signals towards a specific area to improve coverage and/or reduce interference. For example, the signal beam can be tilted up or down depending on the terrain and desired coverage area. Adjusting a tilt of an antenna of the cell site can improve signal quality in specific areas by directing the antenna beam towards the desired coverage zone. For example, the antenna's angle can be physically adjusted using mounting brackets.

In some examples, the signal phase and amplitude can be adjusted within an antenna array to electronically control the direction of the beam without physically moving the antenna. Adjusting a tilt of an antenna of the cell site can focus signals on the intended area and reduce signal leakage to unwanted areas, reduce signal spillover into neighboring cell sites, and/or improve signal strength in high-traffic areas to serve more wireless devices. By adjusting the tilt, the radiation pattern of the antenna can be shaped to focus the signal where it is needed the most, such as densely populated areas or specific coverage gaps.

In some implementations, the computer system trains an AI model using the network data to determine the imbalance in the network coverage. Example AI training methods and an example AI model 530 are described in more detail with reference to FIG. 5. For example, the training data used can include geographical locations, network data, generated polygons, and determined imbalances in traffic, network coverage, etc. The AI model can further be trained to determine an action to adjust the imbalance in the network coverage.

Figure 5:
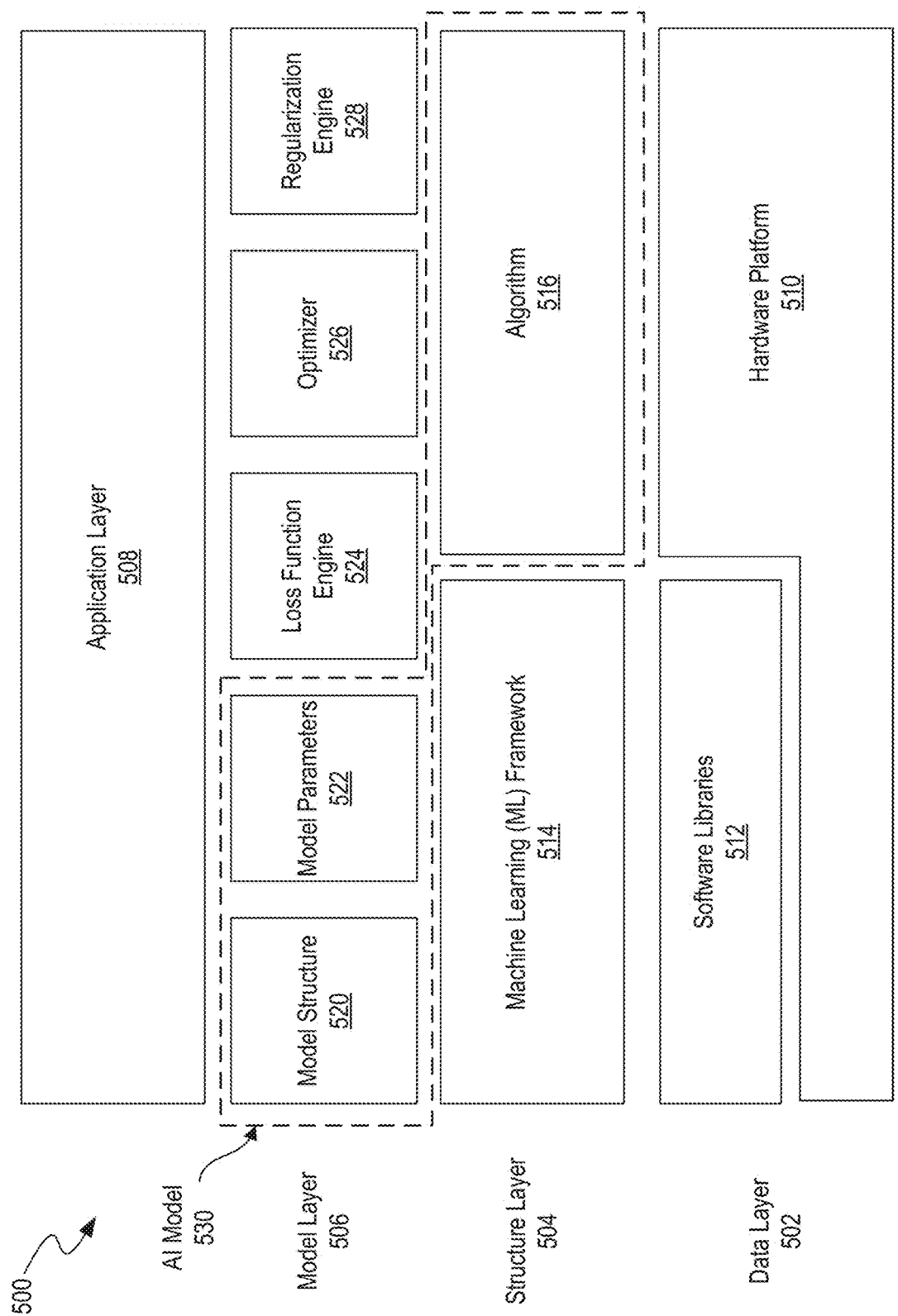
FIG. 5 is a block diagram that illustrates an example AI system that can implement aspects of the present technology.

FIG. 5 is a block diagram that illustrates an example AI system 500 that can implement aspects of the present technology. The AI system 500 is implemented using components of the example computer system 600 illustrated and described in more detail with reference to FIG. 6. For example, the AI system 500 can be implemented on the processor 602 using instructions 608 programmed in the memory 606 illustrated and described in more detail with reference to FIG. 6. Likewise, implementations of the AI system 500 can include different and/or additional components or be connected in different ways. FIG. 5 illustrates a layered architecture of AI system 500 that can implement the AI models of the system 300 of FIG. 3, in accordance with some implementations of the present technology. Accordingly, the computer system described in more detail with reference to FIG. 4 can include one or more components of the AI system 500.

As shown, the AI system 500 can include a set of layers, which conceptually organize elements within an example network topology for the AI system's architecture to implement a particular AI model 530. Generally, an AI model 530 is a computer-executable program implemented by the AI system 500 that analyses data to make predictions. Information can pass through each layer of the AI system 500 to generate outputs for the AI model 530. The layers can include a data layer 502, a structure layer 504, a model layer 506, and an application layer 508. The algorithm 516 of the structure layer 504 and the model structure 520 and model parameters 522 of the model layer 506 together form an example AI model 530. The optimizer 526, loss function engine 524, and regularization engine 528 work to refine and optimize the AI model 530, and the data layer 502 provides resources and support for application of the AI model 530 by the application layer 508.

The data layer 502 acts as the foundation of the AI system 500 by preparing data for the AI model 530. As shown, the data layer 502 can include two sub-layers: a hardware platform 510 (e.g., the computer system and the telecommunications network described in more detail with reference to FIGS. 3-4) and one or more software libraries 512. The hardware platform 510 can be designed to perform operations for the AI model 530 and include computing resources for storage, memory, logic and networking, such as the resources described in relation to FIG. 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model 530, application of the AI model 530, and training data (e.g., geolocated, user reported coverage datasets) for the AI model 530. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model 530. The ML framework 514 can include an open-source library, an application programming interface (API), a gradient-boosting library, an ensemble method, and/or a deep learning toolkit that work with the layers of the AI system facilitate development of the AI model 530. For example, the ML framework 514 can distribute processes for application or training of the AI model 530 across multiple resources in the hardware platform 510. The ML framework 514 can also include a set of pre-built components that have the functionality to implement and train the AI model 530 and allow users to use pre-built functions and classes to construct and train the AI model 530. Thus, the ML framework 514 can be used to facilitate data engineering, development, hyperparameter tuning, testing, and training for the AI model 530. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data (e.g., network coverage data and network capacity data) and create new/modified outputs (e.g., particular actions to adjust network imbalances) based on what was learned. In some implementations, the algorithm 516 can build the AI model 530 through being trained while running computing resources of the hardware platform 510. This training allows the algorithm 516 to make predictions or decisions without being explicitly programmed to do so. Once trained, the algorithm 516 can run at the computing resources as part of the AI model 530 to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator (e.g., imbalanced cells). In an example implementation, training data can include native-format data collected (e.g., raw network data) from various source computing systems described in relation to FIG. 1. Furthermore, training data can include pre-processed data such as geospatial polygons described in relation to FIG. 3. The user may label the training data based on one or more classes and trains the AI model 530 by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations (e.g., particular antenna settings that correct network imbalances) based on training data and are used when input data for the algorithm 516 is discrete. Said differently, when learning through classification techniques, the algorithm 516 receives training data labeled with categories (e.g., the different documented network strategies used to design intended traffic proportions between layers) and determines how features observed in the training data (e.g., signal strength, network traffic) relate to the categories. Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data (e.g., network data). In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure (e.g., clusters) of a set of data, group the data according to similarities, and represent that set of data in a compressed format. The computer system can use unsupervised learning to identify clusters in digital content history (e.g., to identify network data points close to each other) and so forth. In some implementations, performance of the AI model 530 that can use unsupervised learning is improved because the incoming network data from the wireless devices or a telecommunications network is pre-processed and reduced, based on the relevant context, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model 530 using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model 530 of the AI system 500. The model structure 520 defines the complexity of the pattern/relationship that the AI model 530 expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model 530 and the actual output of the AI model 530 and is used to guide optimization of the AI model 530 during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model 530. Overfitting occurs when the algorithm 516 is overly complex and too adapted to the training data, which can result in poor performance of the AI model 530. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model 530 and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 is part of the computer system described with reference to FIG. 4.

Computer System

Figure 6:
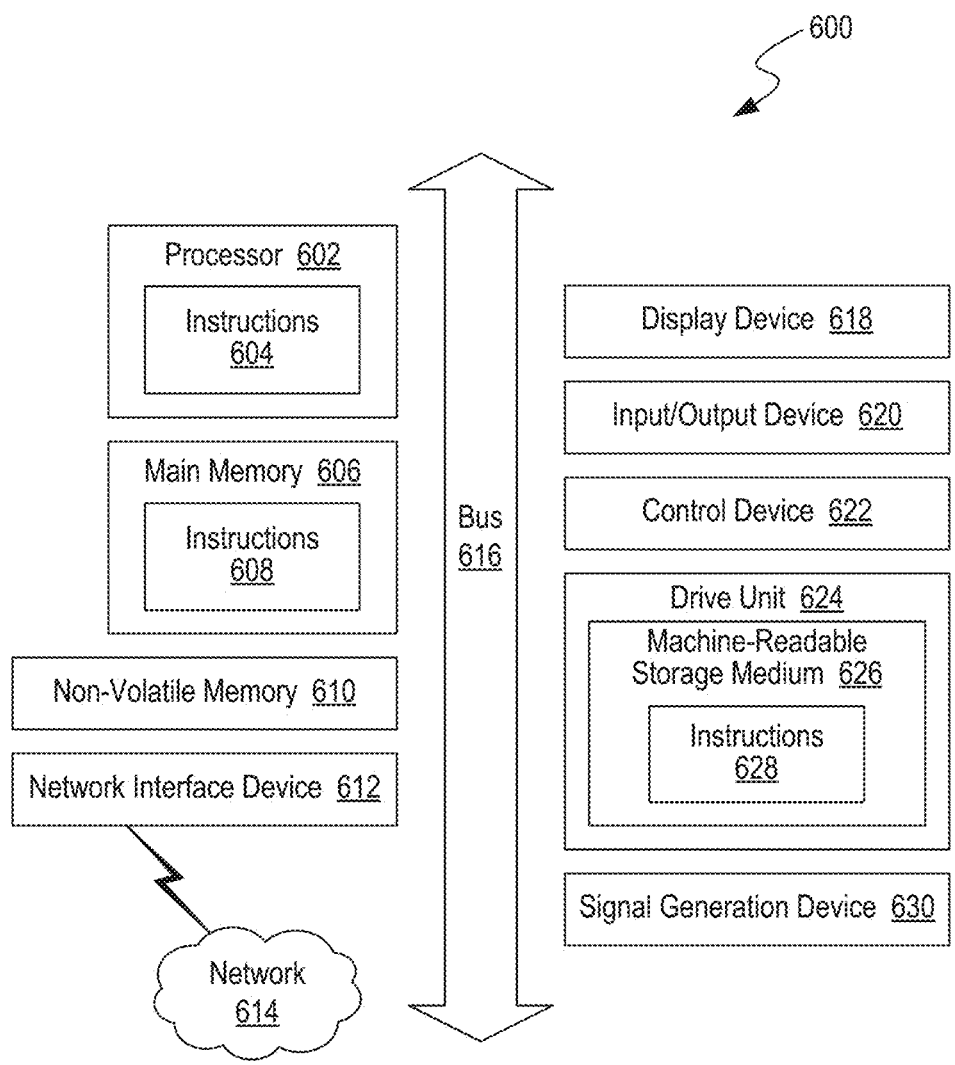
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer system comprising:
   at least one hardware processor; and
   at least one non-transitory memory storing instructions, which, when executed by the at least one hardware processor, cause the computer system to:
   obtain network data describing network coverage provided to multiple user equipments by a sector of a cell site including a first cell and a second cell,
   wherein the network data is associated with multiple geographical locations serviced by the sector, and
   wherein the first cell and the second cell are associated with a particular spectrum frequency of the sector;
   group, using an unsupervised artificial intelligence method, the network data according to the geographical locations into a first cluster and a second cluster,
   wherein the first cluster is associated with the first cell and the second cluster is associated with the second cell;
   generate a first geospatial polygon associated with the first cluster and a second geospatial polygon associated with the second cluster;
   determine an imbalance in the network coverage by comparing the first geospatial polygon with the second geospatial polygon; and
   perform an action on the cell site to adjust the imbalance in the network coverage.

2. The computer system of claim 1, wherein the computer system is caused to:
   train an artificial intelligence model using the network data to:
   determine the imbalance in the network coverage; and
   determine the action to adjusting the imbalance in the network coverage.

3. The computer system of claim 1, wherein the network data is obtained by crowdsourcing.

4. The computer system of claim 1, wherein performing the action includes adjusting a tilt of an antenna of the cell site.

5. The computer system of claim 1, wherein performing the action includes adjusting an azimuth of an antenna of the cell site.

6. The computer system of claim 1, wherein the first cell has a first bandwidth at the particular spectrum frequency and the second cell has a second bandwidth at the particular spectrum frequency, and
   wherein the computer system is caused to:
   compare traffic carried by the first cell and the second cell based on the first bandwidth and the second bandwidth.

7. The computer system of claim 1, wherein the first geospatial polygon is a convex hull, and
   wherein generating the convex hull includes connecting endpoints of the first cluster.

8. At least one non-transitory computer-readable storage medium storing instructions, which, when executed by at least one data processor of a computer system, cause the computer system to:
- obtain network data associated with a sector of a cell site;
- group the network data into a first cluster associated with a first layer and a second cluster associated with a second layer,
    - wherein the first layer is associated with a first spectrum frequency, and the second layer is associated with a second spectrum frequency greater than the first spectrum frequency;
- determine, from the network data, a first amount of traffic associated with the first cluster and a second amount of traffic associated with the second cluster;
- determine, using an artificial intelligence model, an imbalance in the traffic based on the first amount of traffic and the second amount of traffic; and
- determine an action to adjust the imbalance in the traffic.

9. The non-transitory computer-readable storage medium of claim 8, wherein the first layer is associated with a first bandwidth and the second layer is associated with a second bandwidth greater than the first bandwidth.

10. The non-transitory computer-readable storage medium of claim 8, wherein the second amount of traffic is greater than the first amount of traffic.

11. The non-transitory computer-readable storage medium of claim 8, wherein the first layer is associated with a first network coverage and the second layer is associated with a second network coverage less than the first network coverage.

12. The non-transitory computer-readable storage medium of claim 8, wherein the computer system is caused to:
- generate a first geospatial polygon associated with the first cluster and a second geospatial polygon associated with the second cluster; and
- determine whether the second geospatial polygon lies within the first geospatial polygon.

13. The non-transitory computer-readable storage medium of claim 12, wherein the first geospatial polygon circumscribes a first cluster boundary, and the second geospatial polygon circumscribes a second cluster boundary.

14. The non-transitory computer-readable storage medium of claim 8, wherein grouping the network data removes outliers from the network data.

15. A method performed by a computer system, the method comprising:
- obtaining network data describing network coverage provided by a sector of a cell site;
- grouping the network data into multiple clusters associated with multiple layers of the sector, wherein each layer of the multiple layers has multiple frequency carriers;
- generating multiple convex hulls based on the clusters;
- determining differences in the network coverage across the frequency carriers using the convex hulls;
- determining an imbalance in the sector based on the differences in the network coverage; and
- determining an action to adjust the imbalance in the sector based on the differences in the network coverage.

16. The method of claim 15, wherein determining the differences in the network coverage includes comparing boundaries of the convex hulls.

17. The method of claim 15, wherein the layers include at least two of a low-band 5G layer, a mid-band 5G layer, and a high-band-5G layer.

18. The method of claim 15, comprising:
- performing the action on the cell site; and
- determining whether performing the action increased a key performance indicator associated with the cell site.

19. The method of claim 15, comprising:
- training an artificial intelligence model, using the network data to:
    - determine the imbalance in the sector.

20. The method of claim 15, wherein determining the differences in the network coverage is accomplished without drive testing, preventing greenhouse gas emissions caused by multiple vehicles used to determine the imbalance in the sector.

* * * * *